US012595846B2

(12) United States Patent
Engerman

(10) Patent No.: US 12,595,846 B2
(45) Date of Patent: Apr. 7, 2026

(54) TRANSMISSION ACTUATION ASSEMBLY

(71) Applicant: Dana Automotive Systems Group, LLC, Maumee, OH (US)

(72) Inventor: Eric M. Engerman, Plymouth, MI (US)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 0 days.

(21) Appl. No.: 18/883,010

(22) Filed: Sep. 12, 2024

(65) Prior Publication Data
US 2025/0109791 A1      Apr. 3, 2025

Related U.S. Application Data

(60) Provisional application No. 63/587,242, filed on Oct. 2, 2023.

(51) Int. Cl.
| | |
|---|---|
| *F16H 63/18* | (2006.01) |
| *F16H 61/28* | (2006.01) |
| *F16H 61/32* | (2006.01) |
| *F16H 63/30* | (2006.01) |
| *F16H 63/34* | (2006.01) |

(52) U.S. Cl.
CPC ............. *F16H 63/18* (2013.01); *F16H 61/32* (2013.01); *F16H 63/304* (2013.01); *F16H 63/3069* (2013.01); *F16H 63/3425* (2013.01); *F16H 63/3433* (2013.01); *F16H 63/3466* (2013.01); *F16H 2061/2869* (2013.01); *F16H 2063/3056* (2013.01); *F16H 2063/3073* (2013.01)

(58) Field of Classification Search
CPC .. F16H 61/28; F16H 2061/2869; F16H 61/32; F16H 63/18; F16H 63/304; F16H 2063/3056; F16H 63/3069; F16H 2063/3073; F16H 63/34; F16H 63/3408; F16H 63/3416; F16H 63/3425; F16H 63/3433; F16H 63/3466; B60K 1/00; B60K 2001/001
See application file for complete search history.

(56) References Cited

U.S. PATENT DOCUMENTS

| | | | | |
|---|---|---|---|---|
| 2020/0158234 A1* | 5/2020 | Kwon | .................... | F16H 63/304 |
| 2021/0332881 A1* | 10/2021 | Nakao | ................. | F16H 63/3466 |
| 2024/0280174 A1* | 8/2024 | Glückler | ................. | F16H 63/18 |

* cited by examiner

*Primary Examiner* — Richard M Lorence
(74) *Attorney, Agent, or Firm* — McCoy Russell LLP

(57) ABSTRACT

A system and method for an actuation assembly for a transmission. The actuation assembly, in one example, includes a first cam device that is idly coupled to a support shaft and a second cam device idly coupled to the support shaft. The actuation assembly further includes a first one-way clutch which is coupled to the first cam device and an idler gear that is rotationally coupled to an actuator and a second one-way clutch that is coupled to the second cam device and the idler gear that is rotationally coupled to the actuator.

20 Claims, 4 Drawing Sheets

TRANSMISSION ACTUATION ASSEMBLY

CROSS-REFERENCE TO RELATED APPLICATION

The present application claims priority to U.S. Provisional Application No. 63/587,242, entitled "TRANSMISSION ACTUATION SYSTEM", and filed on Oct. 2, 2023. The entire contents of the above-listed applications are each hereby incorporated by reference for all purposes.

TECHNICAL FIELD

The present disclosure relates to an actuation assembly in a transmission with dual-cam actuation functionality.

BACKGROUND AND SUMMARY

Certain vehicle transmissions have spatial constraints which in some cases conflict with performance demands such as shifting performance. Further, the inventor has recognized a need to reduce the number of transmission components while retaining multi-speed shifting and park lock functionality. Further, more generally the inventor has recognized a desired to increase the space and energy efficiency of actuators in transmissions such as clutch and park-lock actuators.

The inventor has recognized the abovementioned challenges and developed an actuation assembly for a transmission to at least partially overcome the challenges. The actuation assembly, in one example, includes a first cam device that is idly coupled to a support shaft and a second cam device that is idly coupled to the support shaft. The actuation assembly further includes a first one-way clutch that is coupled to the first cam device and an idler gear that is rotationally coupled to an actuator and a second one-way clutch that is coupled to the second cam device and the idler gear that is rotationally coupled to the actuator. Further, in the actuation assembly the first and second one-way clutches drive the first and second cam devices in opposing rotational directions. In this way, one actuator is used to drive two cam devices, thereby decreasing the number of components in the transmission while achieving desired transmission functionality and performance.

In one example, the first cam device may be a barrel cam that is coupled to a clutch shift fork and the second cam device may be a cam shaft that actuates a park pawl. In this way, the actuation system is able to provide both gear shifting and park lock functionality, thereby expanding the transmission's functionality in a compact, less complex, and energy efficient package.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

A dual-function actuation system for a transmission is described herein that achieves increased space and energy efficiency is described herein. The dual-function actuation system includes an actuator that rotationally drives a first cam device in one rotational direction and rotationally drives another cam device in the opposite rotational direction. To allow the system to independently actuate the cam devices, one-way clutches, such as sprag clutches, are coupled to the cam devices and are configured to freely spin in opposing rotational directions. Specifically, in one example, the one-way clutches are rotationally coupled to an inner diameter of an idler gear that is rotationally coupled to the actuator. The dual-function actuation system described herein has a smaller part count than systems that use separate actuators, thereby achieving a less complex design that is simpler to manufacture.

Figure 1:
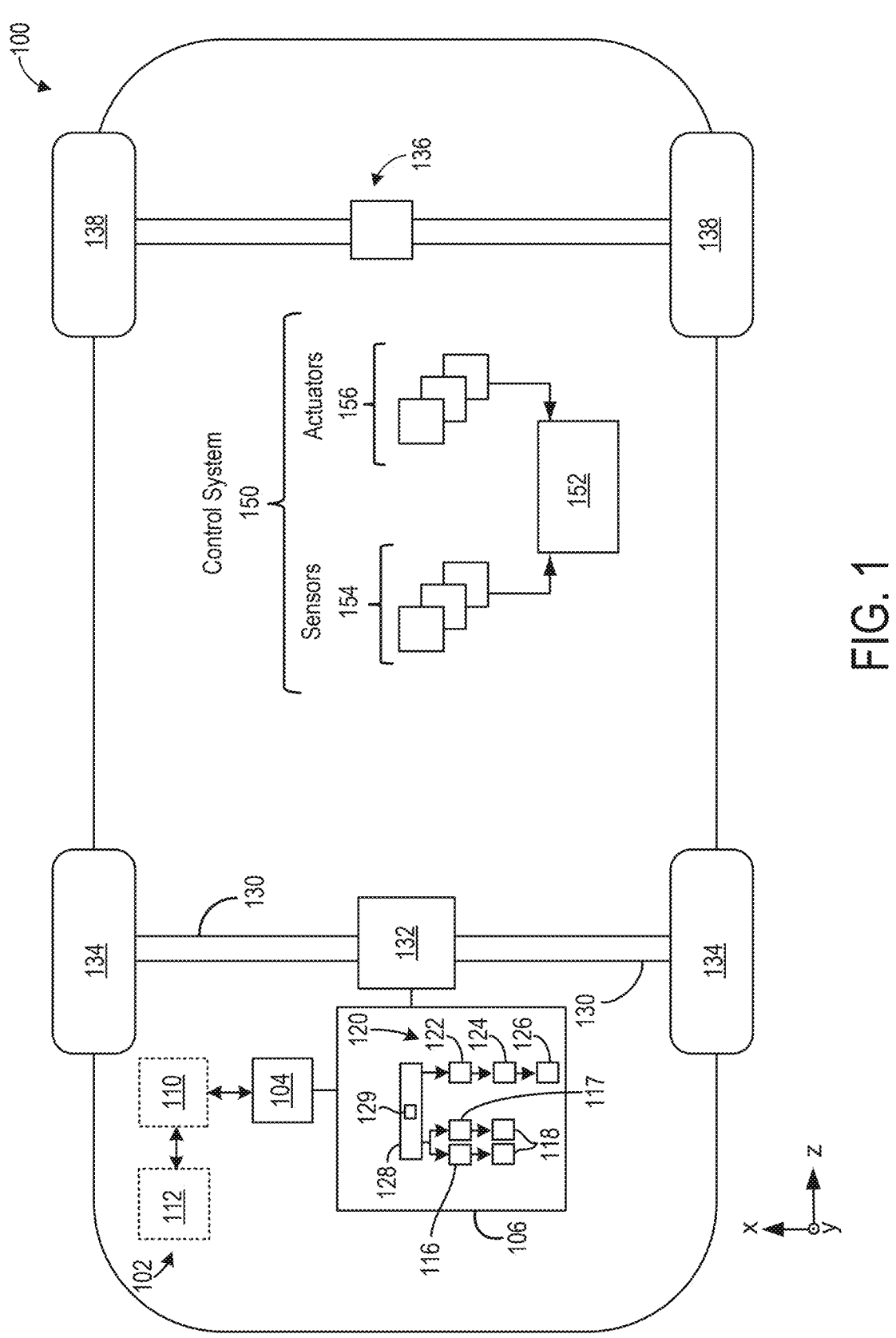
FIG. 1 shows a schematic depiction of a first example of a vehicle with a transmission.

Referring to FIG. 1, a vehicle 100 is depicted. It will be appreciated that the vehicle 100 is shown in FIG. 1 for illustrative purposes and is a non-limiting example of how a vehicle may be configured. Other examples may include variations in arrangements and positioning of vehicle components depicted in FIG. 1, as well as additional components not shown in FIG. 1.

The vehicle 100 may be an all-electric vehicle (EV) (e.g., a battery electric vehicle (BEV)). In other examples, the vehicle 100 may be a hybrid electric vehicle (HEV) with an internal combustion engine. Further, in even other examples, the vehicle 100 may be powered solely by an internal combustion engine. In such an example, the engine may be rotationally coupled to a transmission 106, which is described in greater detail herein. More generally, the vehicle 100 may be a passenger vehicle, a commercial vehicle, an on-highway vehicle, or an off-highway vehicle, in different examples.

The vehicle 100 includes a powertrain 102. The powertrain 102 includes a prime mover 104. The prime mover 104 is a traction motor in the EV example. However, the prime mover may be an internal combustion engine, in other examples. It will be understood that the traction motor may include a rotor that electromagnetically interacts with a stator to drive rotation of a rotor shaft that is included in the rotor. Continuing with the traction motor example, the traction motor may be a multi-phase alternating current (AC) motor, and as such, in some examples, the traction motor may be electrically coupled to the inverter 110 via an electrical connection (e.g., multiphase bus bars, wires, and the like). The inverter 110 is designed to convert direct current (DC) power to AC power and vice versa. In other examples, the inverter 110 may be omitted from the vehicle 100 and the traction motor may be a DC motor.

In the EV example, the inverter 110 may be electrically coupled to an energy storage device 112 (e.g., traction batteries, capacitors, combinations thereof, and the like). A DC electrical connection may be formed between the inverter 110 and the energy storage device 112.

In some examples, the traction motor may be a motor-generator, with a capacity to convert electrical energy into mechanical energy and vice versa. As such, the traction motor may be electrically coupled to the energy storage device 112 (e.g., via the inverter 110) to both draw power from the energy storage device and to generate electrical energy to be stored in the energy storage device. Further, in the case of the vehicle 100 being an HEV vehicle, the energy storage device 112 may be charged by an internal combustion engine, during certain operating conditions.

The prime mover 104 is rotationally coupled (e.g., directly rotationally coupled) to a shaft or other suitable mechanical input component in the transmission 106. The rotational coupling between the prime mover 104 and the transmission 106 may be achieved via a splined interface, a sleeve, bolted flanges, combinations thereof, and the like. As such, the transmission 106 is configured to receive torque input from the prime mover.

The transmission 106 includes clutches 116 and 117 configured to engage gears 118. To elaborate, the clutches may be dog clutches that each are configured to engage one of the gears to alter the transmission's active gear ratio. As such, the transmission is configured to shift between discrete gear ratios. Specifically, two clutches are depicted in FIG. 1. As such, the transmission may be a two-speed transmission, in one specific example which provides a desired balance between gear shifting capabilities and space efficiency. However, the transmission may be designed as a three, four, five, or six speed transmission, in other examples.

The transmission further includes a park lock system 120 which is configured inhibit rotation of the transmission when vehicle speed is zero or approaching zero. The park lock system 120 may include a park cam 122, a park pawl 124, and a park gear 126.

An actuation assembly 128 is configured to engage the clutches 116 and 117 as well as the park lock system 120. In this way, the actuation assembly 128 serves a dual-use functionality which increases system compactness, simplifies transmission manufacturing, and decreases transmission complexity when compared to transmissions with separate actuation systems for the clutches and the park lock system. The actuation assembly 128 includes an actuator 129 (e.g., an electric motor which may receive electric energy from an energy storage device). The actuation assembly 128 is schematically depicted in FIG. 1 but has greater structural complexity and additional components that are expanded upon herein with regard to FIGS. 2-5.

The transmission 106 may transfer torque to axle shafts 130 via the differential 132. The transmission 106 may be rotationally coupled to the differential 132 via shaft(s), gear(s), joint(s), combinations thereof, and the like. As such, the differential 132 may be rotationally coupled the transmission 106 to output torque to the axle shafts 130. In this way, the transmission 106 may transmit torque output from the prime mover 104 to drive wheels 134 via the differential 132 and the axle shafts 130, respectively.

The transmission 106 may include clutches as discussed above as well as shafts, gears, bearings and the like that allow the transmission to be operated in different active and discrete gear ratios. Thus, the gears 118 mesh with additional gears in the transmission's gear train.

The vehicle 100 may additionally include a non-drive axle 136 and wheels 138. However, in other examples the axle 136 may be a drive axle that receives mechanical power from an electric drive and/or an internal combustion engine. In one specific example the axle 136 may be an electric drive axle. In this way, the vehicle may be designed with all-wheel drive capabilities, in certain embodiments.

The vehicle 100 may further include a control system 150 that includes a controller 152, sensors 154, and actuators 156. The controller 152 may be a microcomputer, including elements such as a microprocessor unit, input/output ports, an electronic storage medium for executable programs and calibration values (e.g., a read-only memory chip, random access memory, keep alive memory, and a data bus). In one example, the controller 152 may be a powertrain control module (PCM).

The controller 152 may receive various signals from the sensors 154 that are coupled to various regions of the vehicle 100. For example, the sensors 154 may include clutch position sensors, transmission speed sensors, prime mover sensors for measuring prime mover speed, prime mover temperature, etc., sensors coupled to the energy storage device 112 for measuring a battery state of charge and temperature, and the like. Upon receiving signals from one or more of the sensors 154 of FIG. 1, the controller 152 processes the received signals, and employs one or more of the actuators 156 of the vehicle 100 to adjust prime mover and/or transmission operations based on the received signals as well as instructions stored in memory of the controller 152.

FIGS. 1-3C and 5 include a Cartesian coordinate system to orient the views. The z-axis may be a vertical axis (e.g., parallel to a gravitational axis), the y-axis may be a longitudinal axis (e.g., horizontal axis), and/or the x-axis may be a lateral axis, in one example. However, the axes may have other orientations, in other examples.

Figure 2:
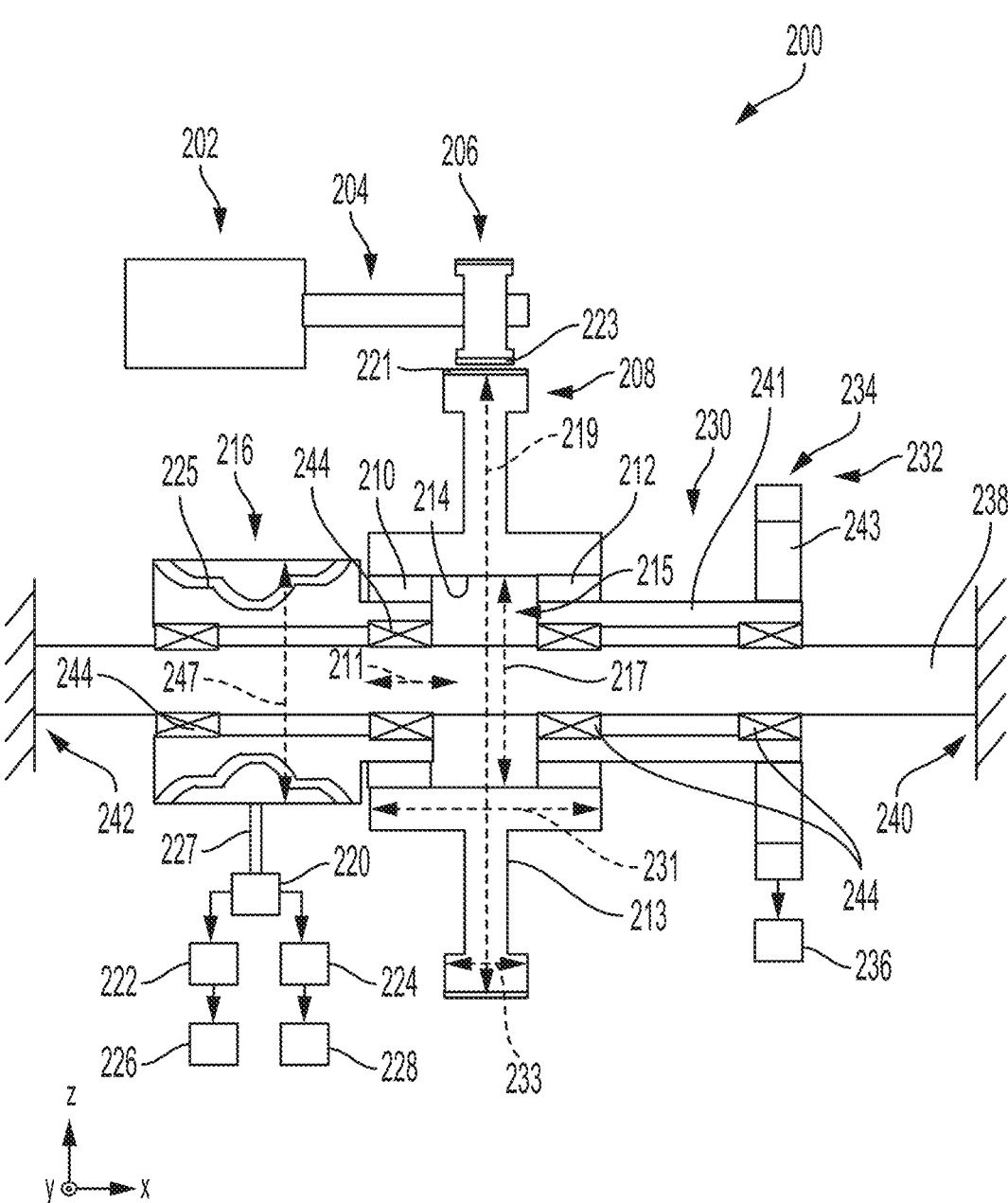
FIG. 2 shows an illustration of an actuation assembly for a transmission.

FIG. 2 shows an example of an actuation assembly 200 that may be included in a transmission, such as the transmission 106, depicted in FIG. 1, in one example, or another suitable transmission, in another example.

The actuation assembly 200 includes an actuator 202. The actuator 202 may be a motor such as an electric motor which provides efficient rotational input for the system. The actuator may receive electrical energy from an energy storage device which may have a lower voltage than the traction battery. However, other actuator configurations have been contemplated. The actuator 202 is configured to rotate in opposing directions to enable dual-function actuation, elaborated upon in greater detail herein.

In the illustrated example, the actuator 202 includes a shaft 204 with a gear 206 that is fixedly coupled thereto or formed therewith. As such, rotation of the shaft 204 drives rotation of the gear 206. Further, in the illustrated example, the gear 206 meshes with an idler gear 208 to drive rotation thereof. However, additional or alternative mechanical mechanisms may be used to drive rotation of the idler gear 208 such as shafts, chains, belts, joints, combinations thereof, and the like.

One-way clutches 210 and 212 are coupled to the idler gear 208. To elaborate, in the illustrated example, the one-way clutches 210 and 212 are coupled to an interior surface 214 of the idler gear 208. As such, the idler gear 208 may include an interior opening 215. In this way, actuation assembly space efficiency is increased. However, other idler gear and one-way clutch arrangements are possible. For instance, the one-way clutches may be coupled to flanges that extend from opposing sides of the idler gear. The one-way clutches 210 and 212 may be positioned on opposing axial sides of a body 213 of the idler gear 208. However, other actuation assembly layouts may be used in other examples.

The one-way clutches 210 and 212 are coaxially arranged, in the illustrated example. A rotational axis 211 of the idler gear 208 and therefore the one-way clutches is provided in FIG. 2, for reference. Specifically, in the illustrated example, the one-way clutches 210 and 212 are coupled to an interior diameter 217 of the idler gear 208. It will be understood that the outer diameter 219 of the idler gear 208 has teeth 221 that mesh with teeth 223 in the gear 206. A width 231 of the inner portion of the idler gear 208 may be greater than a width 233 of the outer portion of the idler gear. In this way, the one-way clutches 210 and 212 are able to be space efficiently incorporated into the interior of the idler gear 208.

Figure 5:
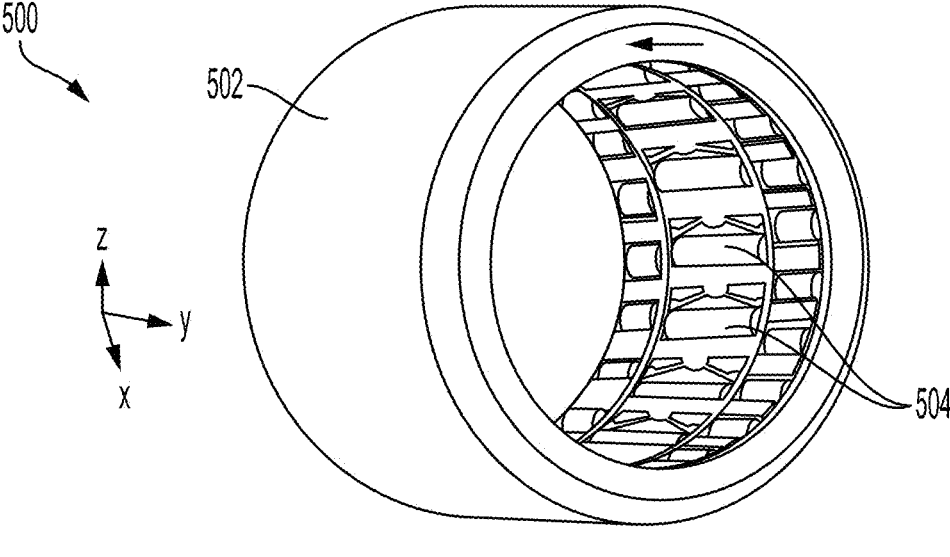
FIG. 5 shows an illustration of an example of a sprag clutch for an actuation assembly.

Both of the one-way clutches 210 and 212 are designed to operate in a drive configuration and a free-wheel configuration based on the direction of rotational input. In the drive configuration torque is transferred from the one-way clutch to the component to which it is attached. Conversely, in the free wheel configuration the one-way clutch and the component to which it is attached independently rotate. An example of a one-way clutch in the form of a sprag clutch is depicted in FIG. 5 and described in greater detail herein. However, other suitable types of one-way clutches may be used in the actuation system, in other examples.

The one-way clutch 210 is coupled to a cam device 216. To elaborate, in the illustrated example, the cam device 216 is a shifting barrel cam device. The shifting barrel cam device is configured to move a shift fork 220. To induce shift fork movement, the cam device 216 includes one or more tracks 225. A cam follower 227 that extends from the shift fork 220 may mate with the one or more tracks 225 to induce movement of the shift fork, when desired. Further, an outer diameter 247 of the cam device 216 may be larger than the outer diameter of the one-way clutch 210.

Figure 4:
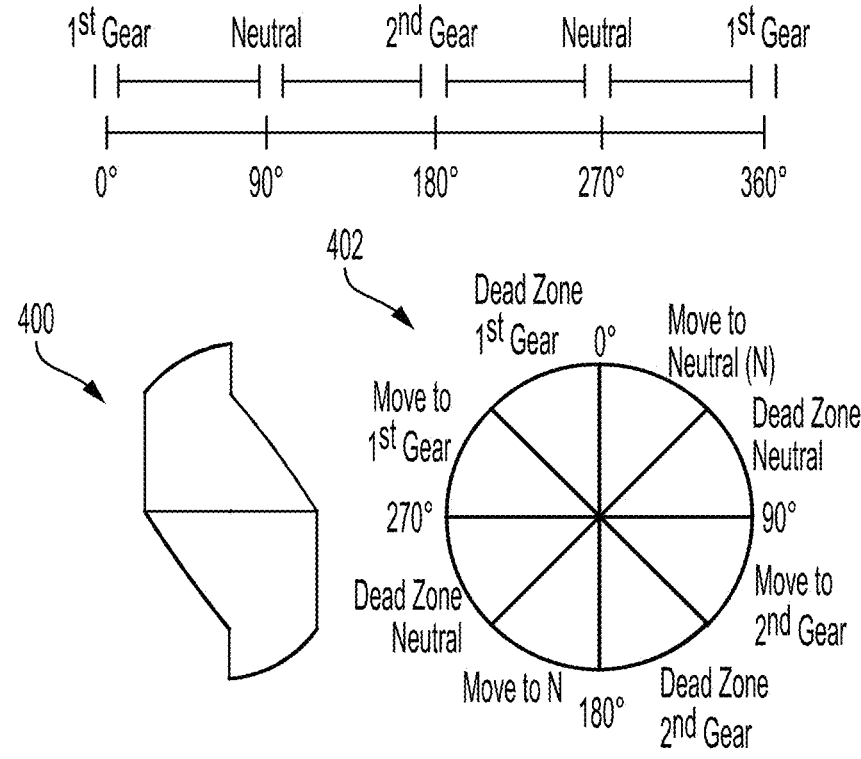
FIG. 4 shows an illustration of a barrel cam for actuating gear clutches that receives input from the actuation assembly, depicted in FIG. 2.

Movement of the shift fork 220 engages and disengages a clutch 222 and a clutch 224 based on the movement of the shift fork. In turn, the clutches 222 and 224 interact with gears 226 and 228 such that they alter the operating gear ratio in the transmission. A detailed illustration of an exemplary barrel cam device is depicted in FIG. 4 and discussed in greater detail herein.

When the clutch 222 is engaged and the clutch 224 is disengaged, the transmission may operate in a first gear mode. Conversely when the clutch 222 is disengaged and the clutch 224 is engaged, the transmission may operate in a second gear mode. The transmission may shift between the gear modes based on operating conditions such as speed and load, for example. The clutches 222 and 224 may be dog clutches or synchronizers, in one example.

Figure 3A:
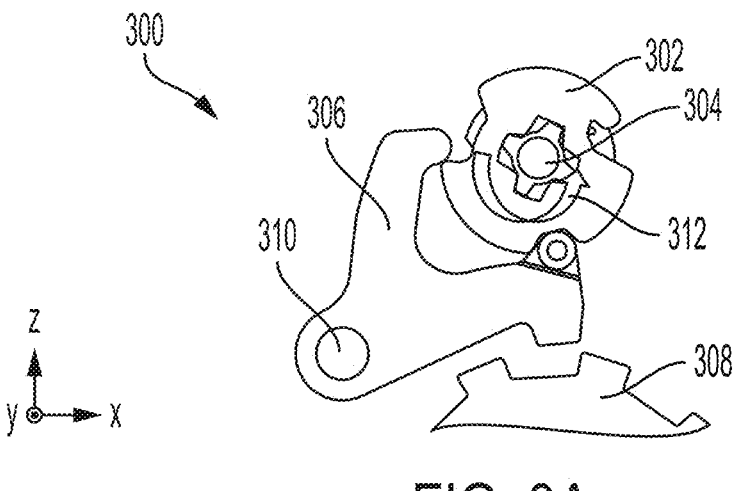
FIGS. 3A-3C show an example of a park lock system that receives actuation input from the actuation assembly, depicted in FIG. 2.
Figure 3B:
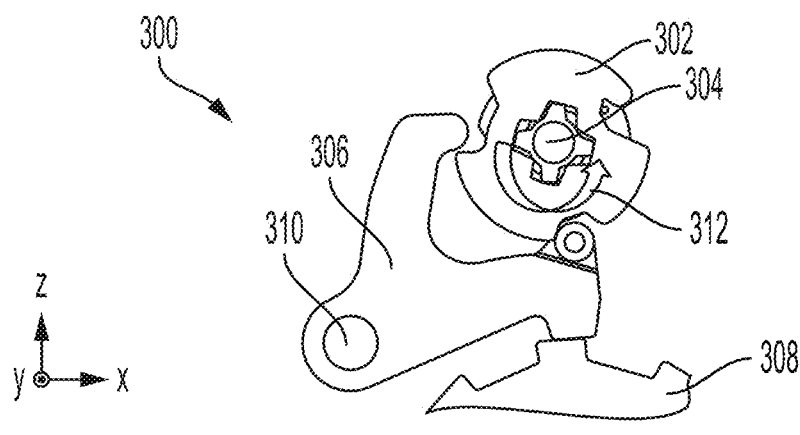
Figure 3C:
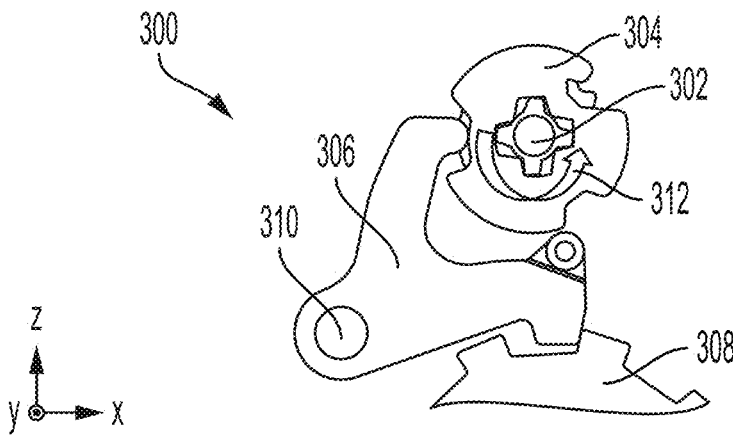

The one-way clutch 212 is coupled to a cam device 230. To elaborate, in the illustrated example, the cam device 230 includes a park cam shaft 241 with a cam 243 arranged thereon that is included in a park lock system 232. The cam 243 is coupled to a park pawl 234. The park pawl 234 that interacts with a park gear 236 which (when engaged) prevents rotation of transmission components. In this way, the vehicle in which the transmission is incorporated is held stationary via the park lock system 232 when desired. However, the cam devices 216 and 230 may have other suitable configurations, in alternate embodiments. FIGS. 3A-3C show a detailed example of a park lock system 232.

As shown in FIG. 2, the cam devices 216, 230 are idly mounted to a support shaft 238. In the illustrated example, the support shaft 238 is supported at opposing axial ends 240, 242, thereby mechanically grounding the shaft and preventing rotation of the shaft. However, other suitable mechanisms for mounting the support shaft 238 in the transmission have been contemplated. Bearings 244 (e.g., roller bearings) are coupled to the support shaft 238 and the cam devices 216 and 230 which allow the cam devices to be idly mounted thereto.

The one-way clutches 210 and 212 are in their drive configurations when the idler gear 208 is rotated in opposing direction. To elaborate, when the idler gear 208 rotates in one direction, the one-way clutch 210 is in a drive configuration for the barrel cam and the one-way clutch 212 is in a free-wheel configuration and vice versa. In this way, one actuator may be used to independently actuate a shifting cam and a parking cam when rotated in opposing directions. As a result, system compactness is increased while achieving park lock and shifting functionality in the system. Further, the clutches and the parking system are able to be independently actuated due to the opposing free-wheeling functionality of the one-way clutches. However, other actuation system arrangements have been contemplated.

FIGS. 3A-3C show an actuation sequence of a park lock system 300. It will be appreciated that the park lock system 300 may be actuated by the actuation assembly 200, depicted in FIG. 2. Specifically, FIG. 3A shows the park lock system 300 in an unlocked state, FIG. 3B shows the park lock system 300 in a transient state, and FIG. 3C shows the park lock system 300 in a locked state.

In the illustrated example, the park lock system 300 in the illustrated example includes a park cam 302 on a cam shaft 304, a park pawl 306, and a park gear 308. Further, in the illustrated example, rotation of the park cam 302 via the actuation assembly (e.g., the actuation assembly 200, shown in FIG. 2) induces rotation of the park pawl 306 about a pivot 310. To elaborate, rotation of the park cam 302 in direction 312 moves the park pawl 306 downward and vice versa. In this way, the park lock system 300 may be engaged and disengaged. Engagement of the park gear 308 prevents rotation of transmission components. However, other suitable parking system architectures may be used in other examples.

FIG. 4 shows different abstracted representations of a barrel cam 400 that may be actuated by an actuation assembly such as the actuation assembly 200, depicted in FIG. 2. As shown in FIG. 4 the cam 400 has designated rotational ranges that correspond to different actuations states of the barrel cam, indicated at 402. To elaborate, the barrel cam may have neutral zones from 45° to 90° and from 225° to 275°. Further, the neutral transient zones which move the shift fork to neutral may be from 0° to 45° and 180° to 225°.

The barrel cam 400 has a first gear zone from 315° to 0° and a transient first gear zone which moves the shift fork to a first gear engagement position from 275° to 315°. The barrel cam 400 has a second gear zone from 135° to 180° and a transient second gear zone which moves the shift fork to a second gear engagement position from 135° to 180°. In this way, different degrees of barrel cam rotation induce movement of a shift fork into a neutral position, a first gear position, and a second gear position. To elaborate, when the barrel cam is in the first gear zone, the first gear clutch is engaged and the second gear clutch is disengaged. Conversely, when the barrel cam is in the second gear zone, the first gear clutch is disengaged and the second gear clutch is engaged. However, the barrel cam may be designed with other suitable actuation rotational ranges, in other examples.

FIG. 5 shows an example of a one-way clutch in the form of a sprag clutch 500. The sprag clutch 500 may be used in any of the actuation systems described herein or combinations of the actuation systems. The sprag clutch 500 includes an outer race 502 and multiple sprags 504 which in the actuation assembly embodiment selectively engage the associated cam device. The sprags 504 are profiled to transfer torque from the outer race 502 to the cam device when the sprag clutch 500 is driven in a first direction and allow the cam device and the outer race to independently rotate when the clutch is driven in the opposing direction. It will be appreciated, that the sprag clutch 500 may be used as the one-way clutches in the actuation assembly 200, depicted in FIG. 2.

FIGS. 3A-3C and 5 are drawn approximately to scale, aside from the schematically depicted components. However, the components may have alternate relative dimensions, in other embodiments.

FIGS. 1-5 show example configurations with relative positioning of the various components. However, it will be appreciated that if shown directly contacting each other, or directly coupled, then such elements may be referred to as directly contacting or directly coupled, respectively, at least in one example. Similarly, elements shown contiguous or adjacent to one another may be referred to as contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such. Still further in some examples, elements positioned coaxial or parallel to one another may be referred to as such.

The invention is further described in the following paragraphs. In one aspect, an actuation assembly in a transmission is provided that comprises a first cam device idly coupled to a support shaft; a second cam device idly coupled to the support shaft; a first one-way clutch coupled to the first cam device and an idler gear that is rotationally coupled to an actuator; and a second one-way clutch coupled to the second cam device and the idler gear that is rotationally coupled to the actuator; wherein the first and second one-way clutches drive the first and second cam devices in opposing rotational directions. In one example, the first cam device may be a barrel cam that is coupled to a clutch shift fork. Further, in one example, the clutch shift fork may be configured to actuate a first clutch and a second clutch. Still further in one example, the transmission may be a two-speed electric transmission. In one example, the second cam device may be a cam shaft that actuates a park pawl. Still further in one example, the first one-way clutch and the second one-way clutch may be sprag clutches. In one example, the actuator may be an electric motor. Further, in one example, the first and second one-way clutches may be positioned radially inward from the idler gear. Further, in one example, the actuation assembly may further comprise a plurality of roller bearings coupled to the support shaft and the first cam device and the second cam device.

In another aspect, a method for operation of an actuation assembly in a transmission is provided that comprises rotating an idler gear in a first direction to rotate a first cam device; and rotating the idler gear in a second direction, which is opposite the first direction, to rotate a second cam device; wherein the actuation assembly comprises: the first cam device idly coupled to a support shaft; the second cam device idly coupled to the support shaft; a first one-way clutch coupled to the first cam device and the idler gear that is rotationally coupled to an actuator; and a second one-way clutch coupled to the first cam device and an idler gear that is rotationally coupled to an actuator. In one example, rotation of the idler gear in the first direction may actuate a first clutch which engages a first gear. In one example, the method may further comprise rotating the idler gear further in the first direction to rotate the first cam device and actuates a second clutch which engages a second gear. In one example, rotation of the idler gear in the second direction may actuate a park cam which engages a park pawl with a park gear. In one example, the idler gear may be rotated in the first direction in response to receiving a shift command. Further, in one example, the idler gear may be rotated in the second direction in response to receiving a park lock command.

In yet another aspect, an actuation assembly in a transmission is provided that comprises a shifting cam device idly coupled to a support shaft; a parking cam device idly coupled to the support shaft; a first one-way clutch coupled to the shifting cam device and an idler gear that is rotationally coupled to an actuator; and a second one-way clutch coupled to the parking cam device and the idler gear that is rotationally coupled to the actuator; wherein the first and second one-way clutches drive the shifting cam device and the parking cam device in opposing rotational directions. Further, in one example, the shifting cam device may be configured to actuate a shift fork to induce engagement of a first clutch and a second clutch depending on the degree of rotation of the shifting cam device. In one example, the first and second one-way clutches may be sprag clutches which are positioned radially inward from the idler gear. In one example, the support shaft may be grounded at opposing ends of the support shaft. Still further in one example, the actuator may be a motor and the idler gear may mesh with a gear on fixedly coupled to a shaft of the motor.

In another representation, a dual-function actuation assembly for a transmission is provided. The dual-function actuation assembly includes one actuation motor that actuates one or more clutches when rotated in a first direction and actuates a park lock system when rotated in a second direction that is opposite the first direction.

Note that the example control and estimation routines included herein can be used with various powertrain, transmission, and/or vehicle system configurations. The control methods and routines disclosed herein may be stored as executable instructions in non-transitory memory and may be carried out by the control system including the controller in combination with the various sensors, actuators, and other vehicle hardware. Further, the described actions, operations and/or functions may graphically represent code to be programmed into non-transitory memory of the computer readable storage medium in the vehicle control, where the described actions are carried out by executing the instructions in a system including the various hardware components in combination with the electronic controller. One or more of the method steps described herein may be omitted if desired.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, these specific examples are not to be considered in a limiting sense, because numerous variations are possible. For example, the above technology can be applied to powertrains that include different types of propulsion sources including different types of electric machines and engines (e.g., internal combustion engines). The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An actuation assembly in a transmission, comprising:
a first cam device idly coupled to a support shaft;
a second cam device idly coupled to the support shaft;
a first one-way clutch coupled to the first cam device and an idler gear that is rotationally coupled to an actuator; and
a second one-way clutch coupled to the second cam device and the idler gear;
wherein the first and second one-way clutches drive the first and second cam devices in opposing rotational directions.

2. The actuation assembly of claim 1, wherein the first cam device is a barrel cam that is coupled to a clutch shift fork.

3. The actuation assembly of claim 2, wherein the clutch shift fork is configured to actuate a first clutch and a second clutch.

4. The actuation assembly of claim 3, wherein the transmission is a two-speed electric transmission.

5. The actuation assembly of claim 1, the second cam device is a cam shaft that actuates a park pawl.

6. The actuation assembly of claim 1, wherein the first one-way clutch and the second one-way clutch are sprag clutches.

7. The actuation assembly of claim 1, wherein the actuator is an electric motor.

8. The actuation assembly of claim 1, wherein the first and second one-way clutches are positioned radially inward from the idler gear.

9. The actuation assembly of claim 1, further comprising a plurality of roller bearings coupled to the support shaft and the first cam device and the second cam device.

10. A method for operation of an actuation assembly in a transmission, comprising:
rotating an idler gear in a first direction to drive rotation of a first cam device; and
rotating the idler gear in a second direction, which is opposite the first direction, to drive rotation of a second cam device;
wherein the actuation assembly comprises:
the first cam device idly coupled to a support shaft;
the second cam device idly coupled to the support shaft;
a first one-way clutch coupled to the first cam device and the idler gear that is rotationally coupled to an actuator; and
a second one-way clutch coupled to the second cam device and the idler gear.

11. The method of claim 10, wherein rotation of the idler gear in the first direction actuates a first clutch which engages a first gear.

12. The method of claim 11, further comprising:
rotating the idler gear further in the first direction to rotate the first cam device and actuate a second clutch which engages a second gear.

13. The method of claim 10, wherein rotation of the idler gear in the second direction actuates a park cam which engages a park pawl with a park gear.

14. The method of claim 10, wherein the idler gear is rotated in the first direction in response to receiving a shift command.

15. The method of claim 10, wherein the idler gear is rotated in the second direction in response to receiving a park lock command.

16. An actuation assembly in a transmission, comprising:
a shifting cam device idly coupled to a support shaft;
a parking cam device idly coupled to the support shaft;
a first one-way clutch coupled to the shifting cam device and an idler gear that is rotationally coupled to an actuator; and
a second one-way clutch coupled to the parking cam device and the idler gear;
wherein the first and second one-way clutches drive the shifting cam device and the parking cam device in opposing rotational directions.

17. The actuation assembly of claim 16, wherein the shifting cam device is configured to actuate a shift fork to induce engagement of a first clutch and a second clutch depending on the degree of rotation of the shifting cam device.

18. The actuation assembly of claim 16, wherein the first and second one-way clutches are sprag clutches which are positioned radially inward from the idler gear.

19. The actuation assembly of claim 16, wherein the support shaft is mechanically grounded at opposing ends of the support shaft.

20. The actuation assembly of claim 16, wherein the actuator is a motor and the idler gear meshes with a gear on fixedly coupled to a shaft of the motor.

* * * * *